(12) United States Patent
Boardman

(10) Patent No.: US 12,165,225 B1
(45) Date of Patent: Dec. 10, 2024

(54) SYSTEMS AND METHODS FOR IMPROVED WATER SUPPLY FORECASTS

(71) Applicant: Mountain Hydrology LLC, Reno, NV (US)

(72) Inventor: Elijah Nathaniel Boardman, Reno, NV (US)

(73) Assignee: Mountain Hydrology LLC, Reno, NV (US)

( * ) Notice: Subject to any disclaimer, the term of this patent is extended or adjusted under 35 U.S.C. 154(b) by 0 days.

(21) Appl. No.: 18/592,239

(22) Filed: Feb. 29, 2024

(51) Int. Cl.
*G06Q 50/06* (2024.01)
*G01W 1/00* (2006.01)

(52) U.S. Cl.
CPC .............. *G06Q 50/06* (2013.01); *G01W 1/00* (2013.01)

(58) Field of Classification Search
CPC ................................ G06Q 50/06; G01W 1/00
See application file for complete search history.

(56) References Cited

U.S. PATENT DOCUMENTS

| | | | |
|---|---|---|---|
| 11,335,179 B1 * | 5/2022 | He ........................ | G06N 3/08 |
| 2018/0165616 A1 * | 6/2018 | Sun ....................... | G06Q 10/06 |
| 2018/0373993 A1 * | 12/2018 | Petty ..................... | G06F 30/20 |
| 2019/0018918 A1 * | 1/2019 | Wood .................... | G06F 17/18 |
| 2019/0227194 A1 * | 7/2019 | Zhao ..................... | G01S 13/958 |
| 2021/0125200 A1 * | 4/2021 | Lin ....................... | G06Q 30/0202 |
| 2021/0271934 A1 * | 9/2021 | White ................... | G06N 3/045 |

OTHER PUBLICATIONS

Grayson, Moore, and McMahon, "Physically Based Hydrologic Modeling, Is the concept realistic?" Water Resources Research, vol. 26, No. 10, pp. 2659-2666, Oct. 1992 (Year: 1992).*
Zahidul Islam, "Literature Review on Physically Based Hydrologic Models" University of Alberta, May 2011 (Year: 2011).*
Huang et al., "Evaluation of snow data assimilation using the ensemble Kalman filter for seasonal streamflow prediction in the western United States", Hydrology and Earth System Sciences, published Jan. 31, 2017 (Year: 2017).*
Cuo et al., "Hydrologic Prediction for Urban Watersheds with the Distributed Hydrology-Soil-Vegetation Model", Hydrological Processes (2008) (Year: 2008).*
Sun et al., "Physically based distributed hydrological model calibration based on a short period of streamflow data: case studies in four Chinese basins", Hydrological Earth System and Sciences, vol. 21, pp. 251-265 (Year: 2017).*

(Continued)

*Primary Examiner* — Andrew Chase Lakhani
(74) *Attorney, Agent, or Firm* — Cognition IP, P.C.; Edward Steakley; Saleh Kaihani

(57) ABSTRACT

Accurate water supply forecasting is useful to increase the efficiency of water management. An auxiliary or meta model can be coupled to a base physically based hydrological model to more accurately predict drought or surplus water supply. The hydrology model can be run up to a certain date, for example, up to an assimilation date for which measurement-informed snow data are available. Comparison of measured versus modeled data can be used to infer sources of error in the hydrological model. Errors in the hydrological model can be inferred and corrected based on reanalysis of the model's history and current state. The updated model can be used to generate more accurate water supply forecasts.

20 Claims, 9 Drawing Sheets

(56) References Cited

OTHER PUBLICATIONS

Ren et al "Short-term demand forecasting for distributed water supply networks: a multi-scale approach", 2016 12th World Congress on Intelligent Control and Automation, Jun. 12-15, 2016 (Year: 2016).*

Painter, Thomas H., et al. "The Airborne Snow Observatory: Fusion of scanning lidar, imaging spectrometer, and physically-based modeling for mapping snow water equivalent and snow albedo." Remote Sensing of Environment 184 (2016): 139-152.

Wigmosta, Mark S., Lance W. Vail, and Dennis P. Lettenmaier. "A distributed hydrology-vegetation model for complex terrain." Water resources research 30.6 (1994): 1665-1679.

Wigmosta, Mark S., et al. "The distributed hydrology soil vegetation model." Mathematical models of small watershed hydrology and applications (2002): 7-42.

\* cited by examiner

SYSTEMS AND METHODS FOR IMPROVED WATER SUPPLY FORECASTS

BACKGROUND

Field

This invention relates generally to the field of water supply forecast technology, and more particularly to computer models employed in predicting or forecasting water supply in a geographic region.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Forecasting water supply in a region is a critical part of managing water in a region. Balancing competing water uses such as agricultural, residential, industrial, etc. requires seasonal water management planning, which is facilitated by water supply forecasts. Water managers rely on water supply forecasts to make water management decisions such as scheduling reservoir releases or irrigation diversions. Accurate forecasts can increase the economical and practical efficiency of water supply infrastructure, such as a dam. For example, excess water that can be diverted to electricity generation can increase the revenue generation of an irrigation district during times of surplus. On the other hand, inaccurate water supply forecasts can have dangerous consequences, such as dam failure due to rapid inflow in excess of expectations or crop failure due to unanticipated drought conditions. Consequently, there is a need for robust and accurate water supply forecast methods to assist water managers and protect water stakeholders.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
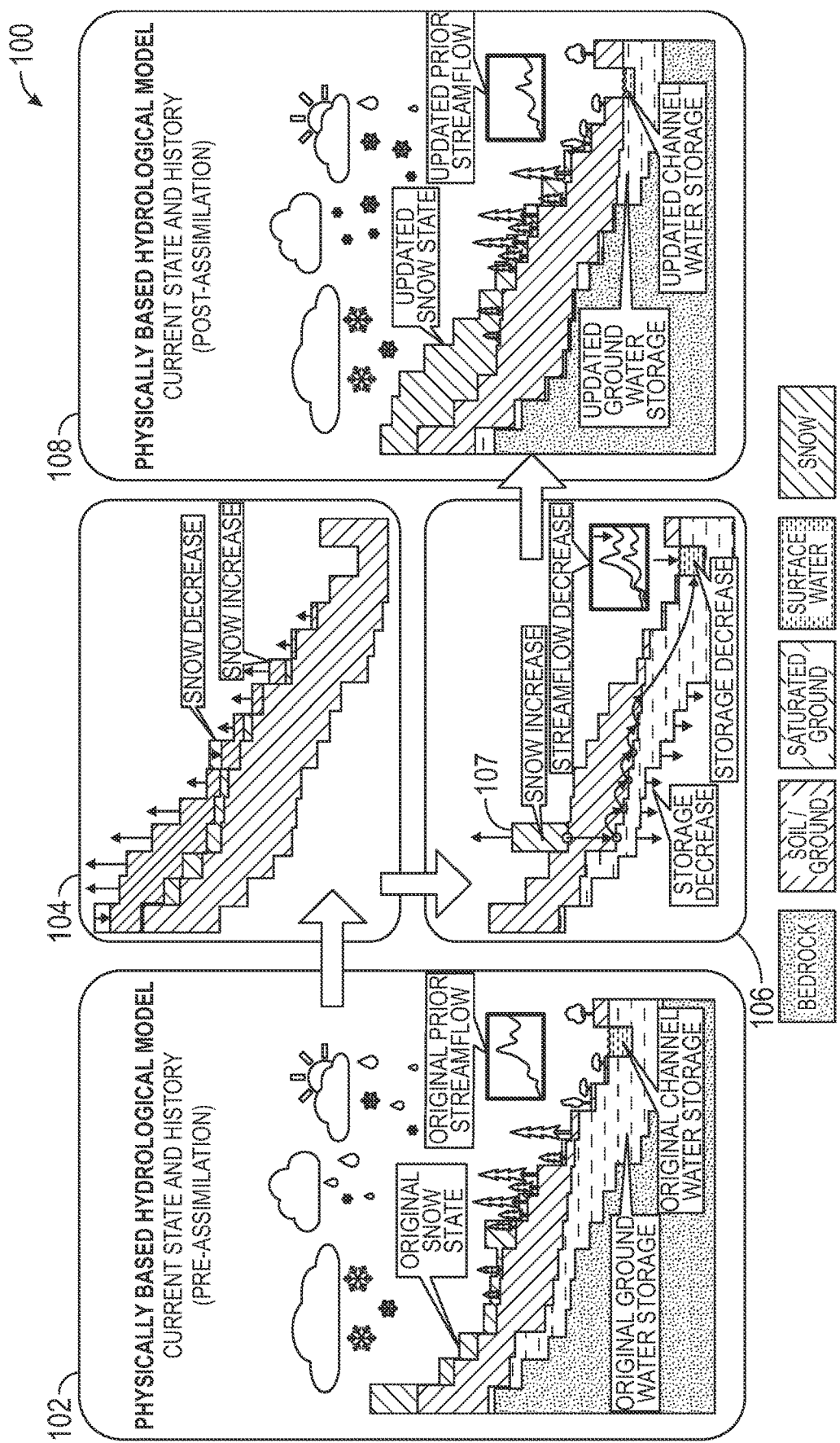
FIG. 1A illustrates a cross-sectional view of a physically based hydrological model (PBHM), in combination with an embodiment of a Snow Assimilation Water Accounting Method (SAWAM), used to generate an updated current state and history for the PBHM, based on measurement-informed snow data.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The embodiments are directed at improving the accuracy and reliability of water supply forecasts (WSF), which can be essential for water management planning. Improved WSF systems and methods create value by allowing water managers to more efficiently manage competing water uses and mitigate potential harms by anticipating drought or flood conditions in advance. As an example, when surplus water availability can be confidently forecast, more water can be allocated to hydropower generation of electricity, as opposed to being reserved for agricultural or municipal usage.

Water supply forecasts typically combine a hydrological model with one or more environmental or meteorological datasets. Snow data acquired by satellite or aircraft remote sensing is particularly useful for constraining water storage in a watershed. Remotely sensed snow data includes lidar-based maps of snow water equivalent (SWE), such as the product produced by Airborne Snow Observatories, Inc. (ASO). A variety of hydrological models can also be used, ranging from simple empirical equations to sophisticated spatially distributed physically based water and energy balance models, or physically based hydrological models (PBHMs). Examples of PBHMs used for water supply forecasting include the Distributed Hydrology Soil Vegetation Model (DHSVM) and WRF-Hydro. These models operate by sequentially solving the water mass and energy balance for each grid cell across a landscape and applying subsurface and/or surface and/or channel routing equations, ultimately producing timeseries outputs of forecast runoff, which can be delivered to water managers. An example PBHM that can be used with some embodiments is the Distributed Hydrology Soil Vegetation Model (DHSVM). Example PBHM models are described and can be found in the following references. In Wigmosta, M. S., Vail, L. W., & Lettenmaier, D. P. (1994), "A distributed hydrology-vegetation model for complex terrain. Water Resources Research, 30(6), 1665-1679. Wigmosta, M. S., Nijssen, B., & Storck, P. (2002), "The Distributed Hydrology Soil Vegetation Model." In V. P. Singh & D. K. Frevert (Eds.), Mathematical Models of Small Watershed Hydrology and Applications (pp. 7-42). Water Resources Publications, LLC. The described embodiments are also applicable to similar or other model structures such as WRF-Hydro.

In some embodiments, a meta-model structure is generated and coupled to an underlying physically based hydrological model (PBHM) (also referred to as "the model"), wherein the snow data are used to retroactively bias-correct the model's history and current state. The model's structure and history inform how these adjustments are applied. The meta-model architecture comprises application of local linearization to the model's mass and energy balance based on the particular model dynamics of each pre-assimilation period. Data assimilation techniques (referred to as "assimilation") can be applied to PBHMs to reduce forecast uncertainty by improving the fidelity of the model's state variables, forcing data, and initial conditions. In the described embodiments, assimilation data can be received from a variety of sources. An example of assimilation can occur when updated snow data is received. Snow data can be in the form of aerial imagery, lidar-based point clouds or rasters, database tables, or in any other format.

The meta-model structure can replace and/or augment a base hydrology model during the various phases of the modeling pipeline, so that the model framework's implicit assumptions during the forecast period are tested during historical calibration and validation of the model. Comparisons using real-world data for historical years show that the meta-model structure can produce a considerable improvement in water supply forecast accuracy compared to both existing assimilation methods and the unaltered base hydrology models.

Operational water supply forecasts can be generated using hydrological models along a spectrum of physical fidelity ranging from simple empirical regressions to physically based distributed-parameter models like DHSVM. The use of distributed physically based hydrological models (PBHMs) is gaining more widespread use, with for example, Scripps CW3E and ASO Inc. operating the similar WRF-Hydro model for California and Colorado forecasts. However, assimilating distributed snow measurements into physically based forecast frameworks has proven challenging because the model dynamics are highly sensitive to external perturbations, and prior assimilation schemes tended to disrupt the model mass and energy balance. One data assimilation method used with physically based distributed hydrological models is "direct insertion," which involves running the model until an assimilation period stops, then replacing the modeled snow data with the measured snow data, and then re-starting the model run. The direct insertion method can violate the water mass balance (e.g., if the snow data show a decrease that is not already in the model, that water effectively vanishes into a "black hole"). Direct insertion can also disrupt the relationship between variables like subsurface water storage, streamflow, precipitation, and snow storage, reducing the value of physically based models, which are specifically designed to accurately represent the evolution of these complex relationships over time. Evidence from the 2022-2023 forecast seasons suggests that direct insertion can actually worsen the model performance compared to a similar forecast framework without assimilation. Consequently, there is a need for systems and methods that can preserve the dynamics and natural processes of a physically based hydrological model while still assimilating the snow observations.

In some embodiments, a "Snow Assimilation Water Accounting Method" (SAWAM) generates a meta-model structure that instantiates a dynamic coupling between spatially distributed snow water equivalent data and a spatially distributed physically based hydrological model (PBHM) using a spatially explicit local linearization of the pre-assimilation model dynamics to construct a time-reversible surrogate model of the water mass and energy balance. The linearized surrogated model is used to infer and correct errors in the history and current state of the PHBM, including errors in precipitation and/or streamflow and/or subsurface storage and/or stream channel storage.

FIG. 1A illustrates a cross-sectional view 100 of a PBHM, in combination with an embodiment of a snow assimilation water accounting method (SAWAM), used to generate an updated current state and history for the PBHM, based on measurement-informed snow data. Block 102 illustrates the current state and history of the PBHM during a pre-assimilation period. Assimilation refers to modifying or incorporating the effects of measurement-informed snow data into the PBHM. Initially, the PBHM can include states and histories, related to initial snow state, initial ground water storage, initial prior streamflow, initial channel water storage, among other states and histories. Block 104 illustrates the SAWAM operations, where a snow state of the PBHM is updated by comparison of the measurement-informed snow data and the modeled snow data. In some locations and/or model elements, snow has increased and/or decreased, when the modeled snow data is compared against the measurement-informed snow data. For each local snow error, the PBHM can be used to infer and correct and/or offset errors in downstream water storage states and streamflow history. Such correction is shown as an example for a single snow error in one grid cell. A snow increase error in grid cell 107 can be offset and/or corrected by a decrease in downstream storage, and streamflow. Block 108 illustrates the post-assimilation PBHM after SAWAM operations, according to an embodiment. The model's updated current state better matches the real world, resulting in more accurate water supply forecasts.

Figure 1B:
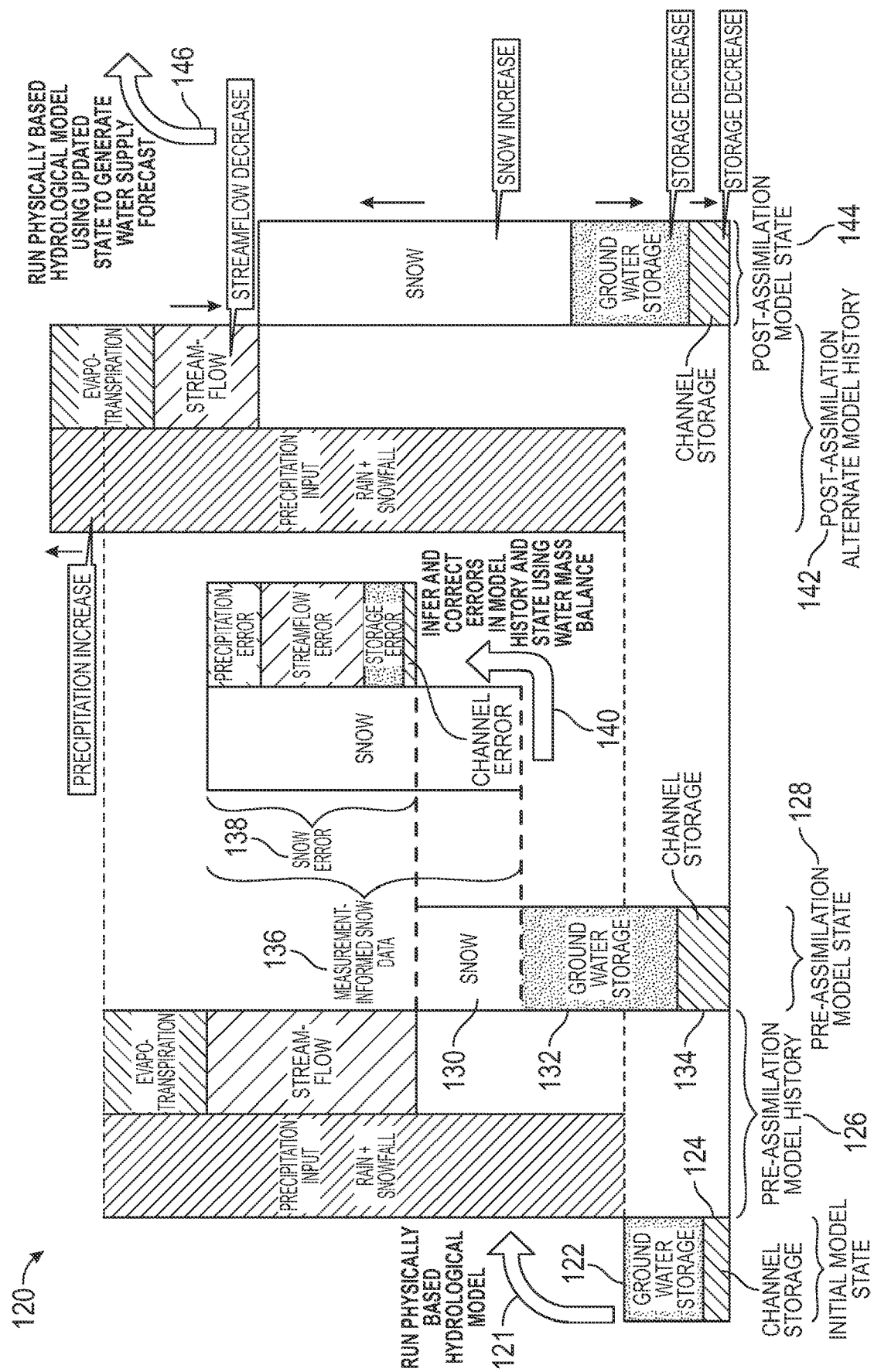
FIG. 1B illustrates a bar chart of the evolution of water mass balance components in a PBHM before, during, and after an assimilation date, when the described embodiments are applied to the PBHM to update its current state and history.

FIG. 1B illustrates a bar chart 120 of the evolution of water mass balance components in a PBHM, for an example period, before, during, and after an assimilation date, when the described embodiments are applied to the PBHM to update its current state and history. The horizontal axis represents the timeline of assimilation of precipitation input data into the PBHM. The vertical axis represents a scaled amount of various water mass balance components, including those above or underground. The PBHM has an initial model state, here depicted by two components, ground water storage 122 and channel storage 124. At step 121 in the evolution timeline of the water mass balance components, running the PBHM, yields a pre-assimilation model history 126. The pre-assimilation model history 126 includes components, such as precipitation input (e.g., rain plus snowfall), evapotranspiration, and streamflow. Running the PBHM yields a pre-assimilation model state 128, which includes an estimation of, or modeled values of, water mass balance components.

Example components shown include snow data 130, ground water storage 132 and channel storage 134, but many other components may also be present, depending on the implementation of the described embodiments. It may be appreciated that the sum of water mass balance components, represented as height in bar chart 120, maintains a constant level so that water is neither created nor destroyed by the model due to the principle of mass conservation. For example, the sum of water mass balance components represented by the pre-assimilation model state 128 may be equal to the sum of water mass balance components contained in the initial state 122-124 and the sum of water inputs minus fluxes out of the watershed, represented here by precipitation minus streamflow and evapotranspiration. The measurement-informed snow data 136 in the bar chart 120 illustrates the snow error 138. In this example, snow error 138 is illustrated as the difference between modeled snow data 130 and the measurement-informed snow data 136. In the example shown, the measurement-informed snow data is larger than the modeled snow data 130, but in other examples decreases may occur as well.

At step 140 in the evolution timeline of the water mass balance components, application of the described embodiments can include inferring and correcting errors in the pre-assimilation model history and state 126, 128, using water mass balance. For example, using water mass balance of the PBHM, the Snow error 138 can be partitioned between, or attributed to, errors in various water mass balance components, such as precipitation error, streamflow error, ground water storage error, channel storage error, and/or other error components. The inferred error components may be determined in relation to the values of the corresponding water mass balance components in the pre-assimilation periods, such as those generated by the PBHM in the pre-assimilation model history 126 and the pre-assimilation model state 128.

Correcting the errors in the pre-assimilation model history and state 126, 128 can yield a post-assimilation alternative model history 142 and a post-assimilation model state 144. The post assimilation period in the timeline shown in the bar chart 120 refers to the period of time after assimilating the measurement-informed snow data 136 in the PBHM. The post-assimilation alternative model history 142 and the post-assimilation model state 144, can include the same water mass balance components as the pre-assimilation model history 126 and the pre-assimilation model state 128, respectively, but with water mass balance components updated to offset the inferred errors. In the example shown, the post-assimilation alternate model history 142 shows an increase in precipitation input, and a decrease in the streamflow. In the example shown, the post-assimilation model state also shows an increase in the snow, a decrease in the ground water storage, and a decrease in the channel storage. However, in other examples, these water mass balance components can change in different directions than those depicted in the example shown in the bar chart 120. At step 146 in the evolution timeline of the water mass balance components, the updated PBHM can be run to generate water supply forecasts.

Figure 1C:
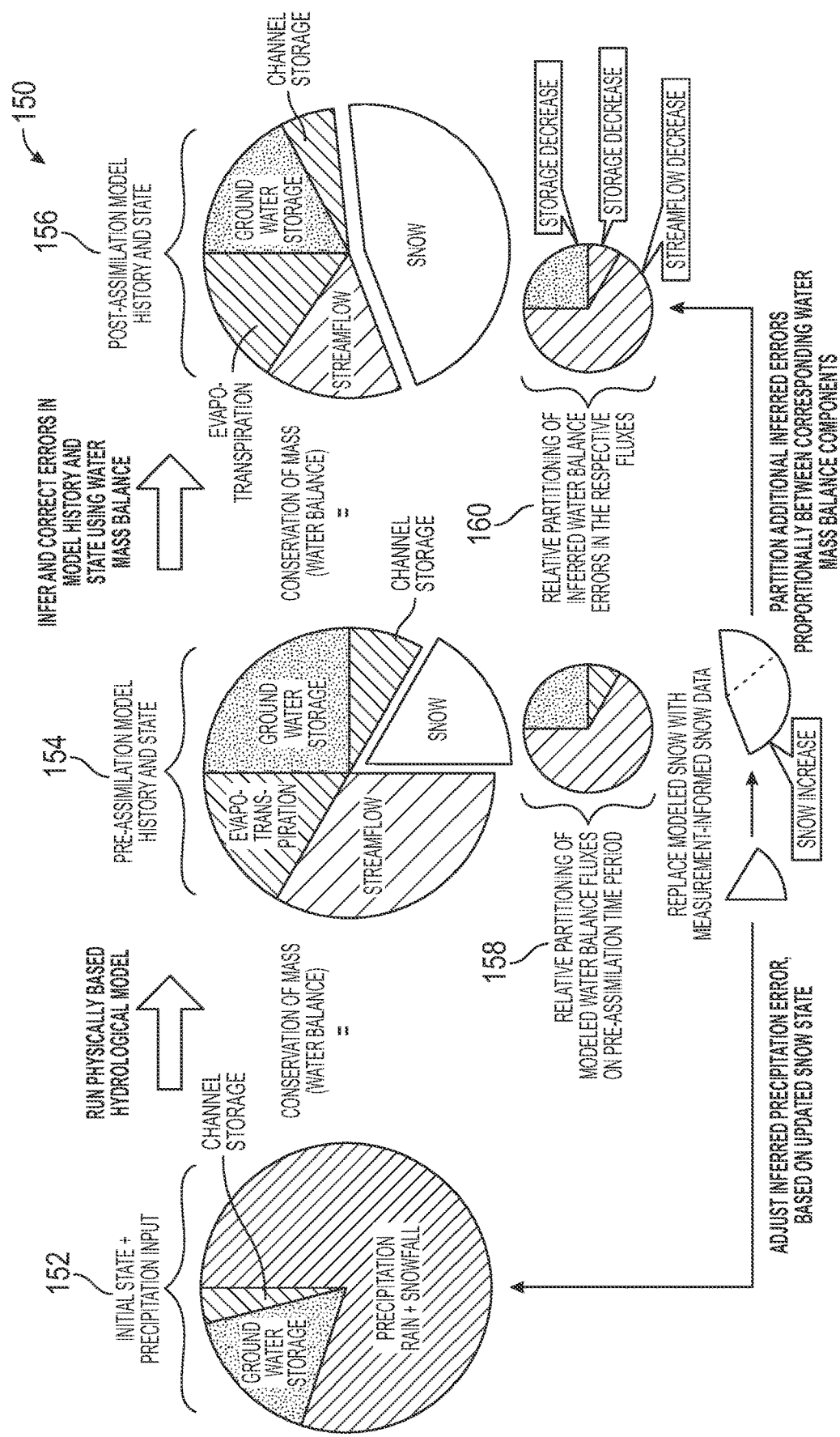
FIG. 1C illustrates pie charts of an error partitioning method applied to infer one or more additional errors in water mass balance components using a PBHM and measurement-informed snow data.

FIG. 1C illustrates pie charts 150 of an error partitioning method applied to infer one or more additional errors in water mass balance components using a PBHM and measurement-informed snow data. The principle of mass conservation may be understood as the idea that water only moves between different locations and is not typically created or destroyed. Thus, the pic charts 150 may be understood to represent the evolution of a fixed quantity of water throughout the steps involved in the described embodiments. A PBHM may be initialized with a known quantity of water storage, for example as ground water or channel storage. As a PBHM simulates a pre-assimilation time period, there may be additional inputs of water to the PBHM, for example, precipitation in the form of rain and/or snowfall. The sum of initial water storage and further water inputs may be understood as the total amount of water mass that must be accounted for at all subsequent times within the model. Initial state and precipitation input pie chart 152 shows example water mass balance components when a PBHM is initialized, such as ground water storage, channel storage, and further water inputs consisting of precipitation (e.g., rain and snowfall) while the PBHM is simulating a pre-assimilation time period.

Running the PBHM for a pre-assimilation period with measured or simulated meteorological inputs can yield pre-assimilation model history and state 154, based on conservation of water mass balance components. As the PBHM simulates a pre-assimilation time period, some water may leave the watershed in the form of fluxes such as streamflow or evapotranspiration, and some water may remain in the watershed, for example as snow, ground water/soil moisture, or channel storage. By the principle of mass conservation, it may be understood that the sum of water storage in state 154 and all fluxes out of the watershed accumulated at the time of state 154 must be equal to the sum of storage in the initial state 152 and fluxes into the watershed accumulated prior to state 154. The pre-assimilation model history and state 154 can include example water mass balance components, such as evapotranspiration, streamflow, ground water storage, channel storage and snow. In some embodiments, water mass balance can be used to infer and correct errors in the pre-assimilation model history and state to obtain post-assimilation model history and state 156, where one or more water balance components may have been updated or adjusted to offset the inferred errors. It may be appreciated that the area of the pie charts representing pre- and post-assimilation water mass balances are equally sized so all water is accounted for by the assimilation method.

Inferring and correcting errors, according to some embodiments can include relative partitioning of modeled water balance fluxes on a pre-assimilation period, yielding pie chart 158. In this example, the proportions in pie chart 158 are derived by calculating water mass balance fluxes comprising the sum of streamflow, channel storage changes, and ground water storage changes on the pre-assimilation period, then dividing each of these terms by their total. It may be appreciated that changes in storage states constitute mass balance fluxes that are represented in pie charts 158 and 160, whereas the magnitude of storage states on a single date are represented in pic charts 152, 154, and 156. For example, the difference between the ground water storage state in pie chart 154 and pie chart 152 determines the size of the ground water storage component in pie chart 158, and the inferred ground water storage error in pie chart 160 determines the difference between ground water storage in pie chart 154 and pie chart 156. Inferring and correcting for errors can further include relative partitioning of inferred water balance errors between the respective fluxes, yielding pie chart 160. In this example, since the snow error was positive (additional snow added to the model), the relative partitioning of inferred water balance errors results in a decrease in the ground water storage, channel storage and streamflow so that the sum of all inferred errors is zero.

The described embodiments further include replacing the PBHM modeled snow with measurement-informed snow data to offset errors in the model's representation of a snow state, which may be inferred by comparison of the measurement-informed and modeled snow data. In the example shown, the measurement-informed snow is larger than the modeled snow, but in other examples, decreases are also possible. Based on the difference or a comparison between the modeled snow data and the measurement-informed snow data, the inferred precipitation error in the initial state and precipitation input pie chart 152 can also be adjusted. In this example, it could be necessary to infer a precipitation error if the amount of snow measured on the assimilation date is greater than the total amount of pre-assimilation precipitation, which would otherwise result in a logical contradiction wherein the snow storage is greater than the total snowfall. If a positive or negative precipitation error is inferred, it may be understood that the three main pie charts 152, 154, and 156 each effectively increase in area so that the amount of water is still conserved at each step, but there is a greater or lesser total mass of water available for partitioning.

Furthermore, additional inferred errors can be partitioned proportionally between corresponding water mass balance components. In the example shown, streamflow, ground water storage, and channel storage are decreased by an amount proportional to the respective pre-assimilation water mass balance flux, e.g., if streamflow comprised 70% of pre-assimilation water mass balance fluxes (pie chart 158), the inferred streamflow error may comprise 70% of the total inferred non-snow errors (pie chart 160).

In the described embodiments, references to "pre-assimilation model history" can alternatively be replaced with or understood as "the original model history for a pre-assimilation period," references to "pre-assimilation model state" can be replaced with or understood as "the current model state for a pre-assimilation period." Similarly, references to "post-assimilation model history" can be replaced with or understood as "updated model history, for a post-assimilation period," references to "post-assimilation model state," can be replaced with or understood as "current model state, for a post-assimilation period." The term "current" refers to the date of the snow data, to be assimilated into the model. Consequently, in this context, the term "model history" refers to the model state before the "current" snow data. After the "current" snow data, the model can produce a "future" forecast phase.

Figure 1D:
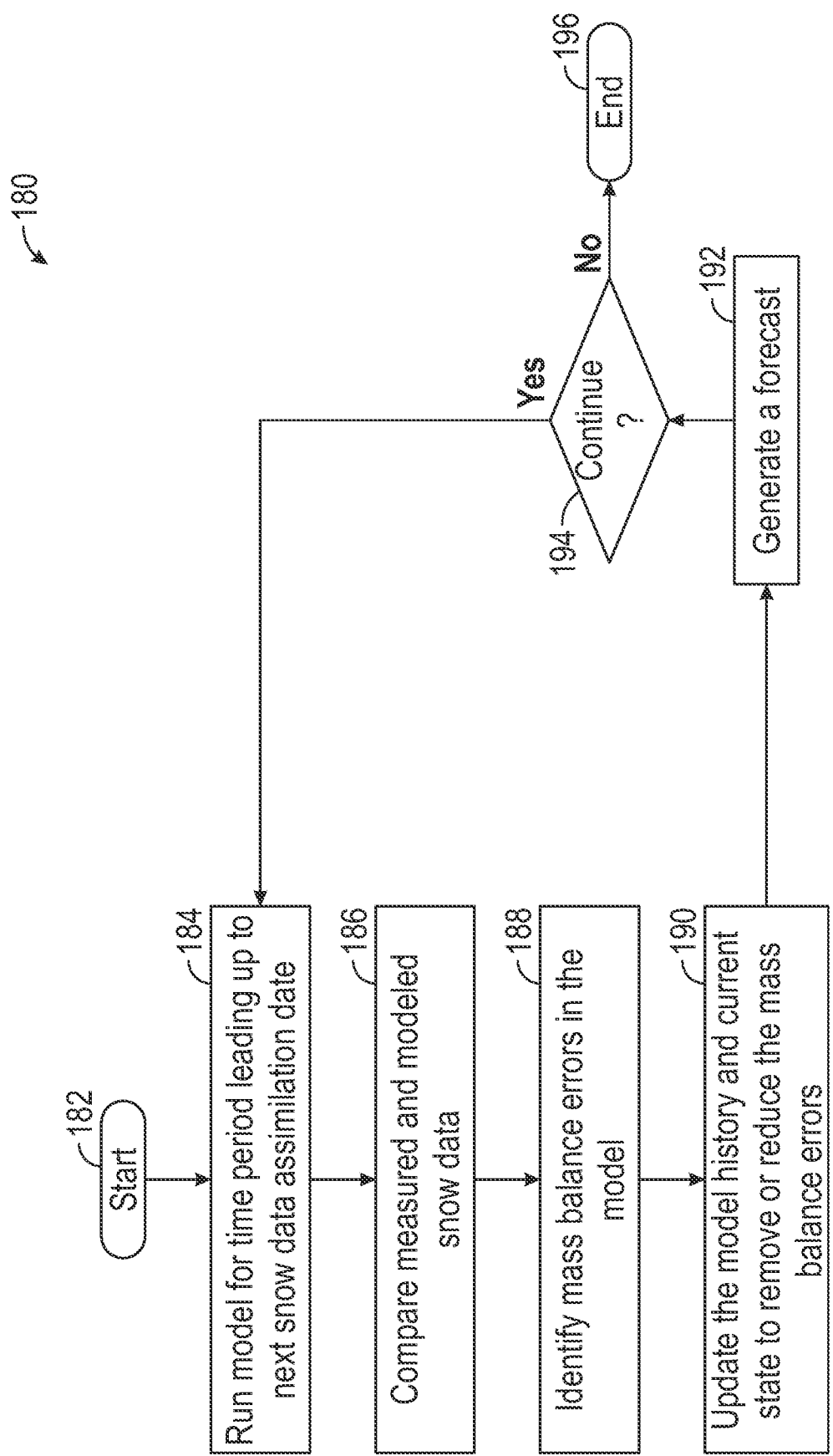
FIG. 1D illustrates a flowchart of example operations of a Snow Assimilation Water Accounting Method (SAWAM) method, according to an embodiment.

FIG. 1D illustrates a flowchart of example operations of a SAWAM method 180. The method starts at step 182. At step 184, the PBHM is run for a period of time leading up to an available or upcoming snow data assimilation date. For example, if the next available snow data has today's date, the PBHM can be run for a period of time up to today's date. Running the PBHM can include receiving measurement informed snow data. Measurement-informed snow data can be derived from a combination of physical or raw snow measurements and/or various intermediary modeling of the raw snow measurements. Consequently, referring to measured data can include measurement data that has been processed by one or more modeling techniques. At step 186, the measured snow data and modeled snow data from step 184 can be compared. At step 188, mass balance errors in the PBHM are identified. At step 190, the model history and the current state can be updated to remove or reduce the identified mass balance errors derived from step 188. At step 192, a water forecast can be generated. At step 194, it is determined whether the method 180 should be continued. If yes, the process moves to step 184, and steps 184-194 are reperformed. If not, the method ends at step 196.

Performing SAWAM, for example by using the method 180, can determine or approximate potential water mass balance errors in the PBHM, including for example, answering questions, such as "why does the model not perfectly re-create the observed snow water volume and distribution?" Snow errors can accumulate from several main sources. Example error sources can include a) errors in the volume or timing of precipitation in the meteorological forcing data; b) errors in the spatial distribution of precipitation across the landscape; c) errors in the partitioning of precipitation between snow and rain; and d) errors in the timing, amount, or spatial distribution of snowmelt. The SAWAM can correct the combined spatiotemporal model errors that produced the observed discrepancy between measured and modeled snow states. With the determined error information, the SAWAM can correct the effects of accumulated errors on the model's history and current state, producing a better starting point for water supply forecasts by increasing the fidelity of the PBHM with respect to the actual physical watershed conditions.

To correct errors in a PBHM, it is desirable to determine what conditions would have been necessary to produce the observed snow state. However, physically based hydrology models are not time-reversible, because at each timestep water flows together and mixes from multiple sources, increasing the entropy of the system. In this scenario, running the model backwards is analogous to trying to unmix two liquids, which is prohibited by the second law of thermodynamics. However, SAWAM uses the model outputs to construct an approximate surrogate model that is time-reversible, enabling an estimation of the error source partitioning. In some embodiments, it can be assumed that the relationship between some combination of the model inputs and outputs is constant for sufficiently small changes to the inputs, defined as local linearization.

SAWAM can leverage different aspects of the underlying hydrological model to address the different error sources discussed above. First, the observed snow map can be compared with the spatial distribution of precipitation in the meteorological data to derive a multiplier map that locally redistributes cold-season precipitation from areas with little snow (e.g., wind-scoured ridges) to areas with deep snow accumulation (e.g., leeward cirques). This pre-processing functionality can help the model get as close as possible to the observed snowpack map before assimilation, reducing the magnitude of the required error adjustments. The PBHM can be run using the multiplier map derived from a particular snow data acquisition in the time period prior to the start date of a water supply forecasting period or from one or more historical snow data observations.

Figure 2:
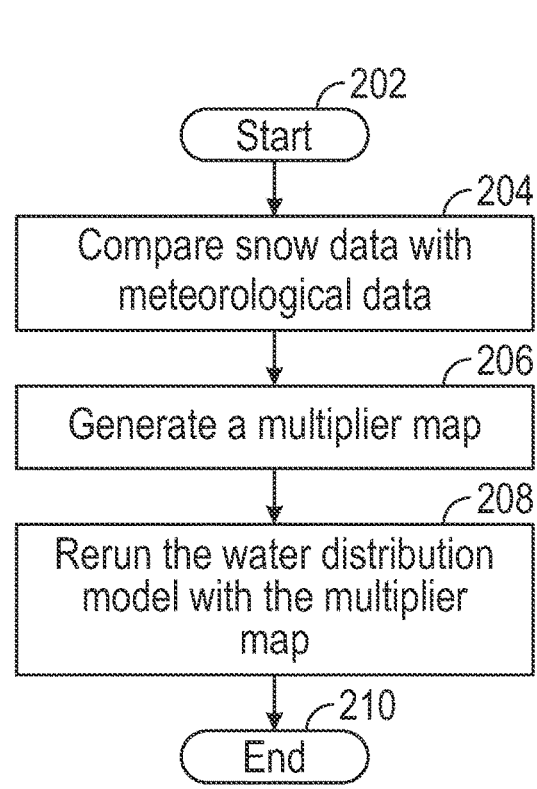
FIG. 2 illustrates a flowchart of an example method of reducing errors in a spatially distributed physical hydrology (SDPH) model utilizing meteorological data.

FIG. 2 illustrates a flowchart of an example method 200 of reducing error in a PBHM utilizing meteorological data. The method starts at step 202. At step 204, the measured snow data is compared with spatial precipitation data from one or more meteorological sources of data. At step 206, a multiplier map is generated from the comparison performed at step 204. The multiplier map can redistribute the precipitation data in the model. For example, the multiplier map can redistribute cold-season precipitation from areas with little snow to areas with deep snow accumulation. This can help the model acquire a state to the observed or measured snow data, prior to the assimilation of the snow data into the model. At step 208, the water distribution model is re-run with the multiplier map. The method ends at step 210.

Figure 3:
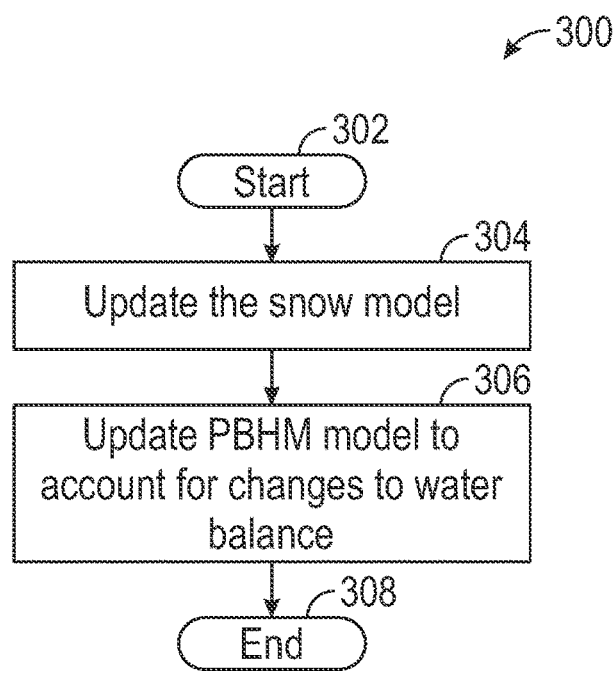
FIG. 3 illustrates a flowchart of an example core assimilation method, according to an embodiment.

In some embodiments, after running the PBHM up to the next assimilation date (step 104) using the pre-calculated precipitation redistribution map, a core assimilation method can be performed. FIG. 3 illustrates a flowchart of an example core assimilation method 300. The method starts at step 302. At step 304, the snow model is updated. At step 306, the updated snow model is used to modify the water balance in the model and account for the changes in the water balance in the model due to the updated snow model. The method ends at step 308.

Updating the snow model can be performed in the following manner. Given an observed map of snow water equivalent (SWE), the corresponding model value is subtracted from each pixel, producing a delta SWE map. The delta SWE map reflects a difference between the measured and the modeled snow. The model SWE values are then replaced with the observed SWE values (e.g. direct insertion). Furthermore, the SAWAM method also updates the model's other snow states, including for example, surface albedo, surface/deep layer temperature, and surface/deep layer liquid water content.

In some embodiments, Random Forest models can be trained on the pre-assimilation states using terrain-based or environmental predictors in addition to the pre-assimilation SWE values, after which the Random Forest models are used to predict the updated states using the updated SWE values. This approach can approximately preserve the energy balance and accumulation/ablation dynamics of the snow model. For example, if the model shows a temperature of $-5°$ C. for 0.1 m SWE depths on steep north-facing slopes near a certain elevation, then wherever the updated snow map implies a similar condition, it can be given a similar value. In this manner, the observations can be matched, while preserving the relationships between state variables and the continuity of the model's physical processes.

The delta SWE map calculated above can provide information on the volumetric error (e.g., area-average water mass increase or decrease), and spatial error (e.g., change in map of snow pattern) of the model. SAWAM can utilize the delta SWE map information along with the model's history (e.g., a timeseries of antecedent mass balance fluxes) and maps or network representations of the current model state variables to infer the volume and timing of errors in the non-snow components of the PBHM. In some embodiments, the mass balance time series can be restricted to the time period starting with the previous assimilation date or the most-recent effective snow-free period (whichever is more recent) and ending with the current assimilation date.

In some embodiments, some or all of the volumetric SWE error (e.g., calculated as the mean of all grid cells in the delta SWE map) may be attributable to precipitation errors. In this scenario, more or less actual precipitation occurred than the amount represented in the meteorological forcing data. The attribution of SWE error to precipitation error can be accomplished by fitting a linear regression model to the pre-assimilation model timeseries of cumulative SWE change and cumulative precipitation. This can generate an approximate "inverse snow accumulation" model, which can be used to infer how much extra/less precipitation would have been needed to explain a small increase/decrease in the observed versus modeled SWE states. However, since the snowpack volume can be affected not only by precipitation but also by snowmelt, the inferred precipitation error may benefit from further adjustment.

In some embodiments, the inferred precipitation error is re-scaled based in part on the fraction of the SWE error that can be reduced by inferring errors in the modeled snow dynamics, which are reanalyzed over a range of plausible alternative physical scenarios. For example, the DHSVM hydrology model partitions precipitation between snow and rain using a linear ramp between two temperature thresholds outside of which all precipitation is snow or rain. These thresholds are calibrated to historical data but remain uncertain and can vary from one year to another. By adjusting these thresholds by a few degrees Celsius and re-computing the amount of pre-assimilation snow from the model's precipitation and temperature timeseries history, the SAWAM can estimate what fraction of the SWE error could be explained by transient errors in the model's snow/rain partitioning scheme. Similarly, the sensitivity of the model to snowmelt processes can be estimated by adding or subtracting the amount of modeled snowmelt. Thus, in one embodiment, the precipitation error may be re-scaled to only account for a portion of the SWE error that cannot be eliminated by inferring errors in snow/rain partitioning or melt dynamics. Other methods of estimating and correcting precipitation errors can also be used. Similarly other errors in the model can be estimated and corrected. Through the estimation and correction of various errors in the model, the described embodiments can generate an alternative history and current state for a PBHM, using a combination of the snow data and pre-assimilation model dynamics. In all cases, error correction methods are selected to preserve the physically based core of the PBHM, such that the updated history and current state do not result in physically implausible implications such as negative precipitation.

In some embodiments, generating an alternate history and/or alternate current state for the PBHM is based at least in part on the inferred errors, wherein the alternate history and/or alternate current state could plausibly have resulted from application of the PBHM to a pre-assimilation time period if the PBHM had more accurately simulated the snowpack dynamics leading up to the date of the measurement-informed snow data. Since it is not possible to derive a definitive alternate history for a PBHM due to the time irreversibility of physical hydrological models, the goal of SAWAM is to generate one or more plausible histories and states that are logically compatible with the PBHM structure and physically consistent with the measurement-informed snow data. SAWAM may select from multiple plausible alternative histories or current states based on a principle of parsimony. Furthermore, in the described embodiments, reference to "alternate history" and "current state" of the PBHM should be understood in the context that these terms ("alternate history" and "current state") may refer to tangible data objects that are saved to a storage device (e.g., a hard drive) and are re-ingested by the PBHM. In this context, the alternate history/state are not just useful concepts, they are persistent products of the assimilation method that can be saved, analyzed and/or used for future model predictions.

Figure 4:
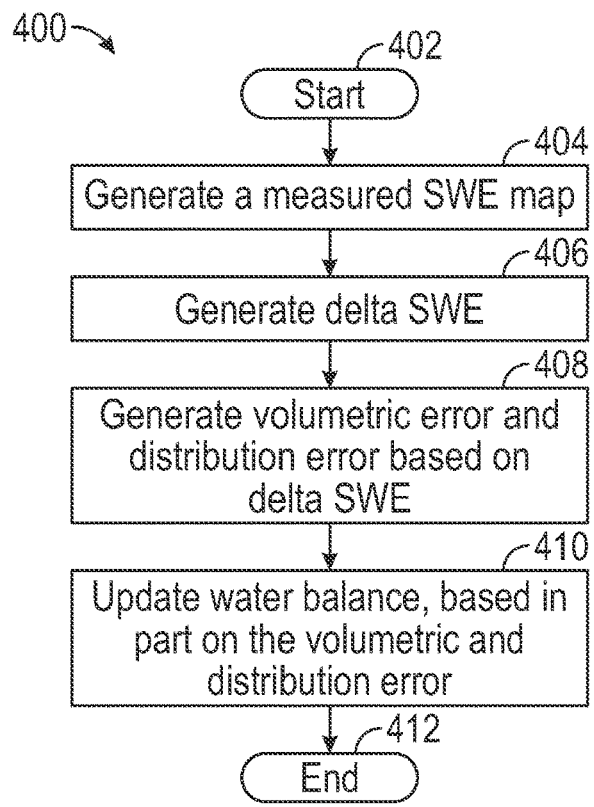
FIG. 4 illustrates a flowchart of an example method of updating the snow model and updating the water balance in a PBHM to reflect the updated snow model.

FIG. 4 illustrates a flowchart of an example method 400 of updating the snow model and updating the water balance in a PBHM to reflect the updated snow model. The method starts at step 402. At step 404, a measured snow water equivalent (SWE) map is generated, based on measured snow data and/or measurement-informed snow data. At step 406, a delta SWE parameter is generated by subtracting the measured snow data from the modeled snow data, obtained from the PBHM. At step 408, volumetric and spatial or distribution errors are generated, based at least in part on the delta SWE. At step 410, the water balance in the PBHM can be updated, based in part on the volumetric and distribution errors generated at step 408. The method ends at step 410.

Figure 5:
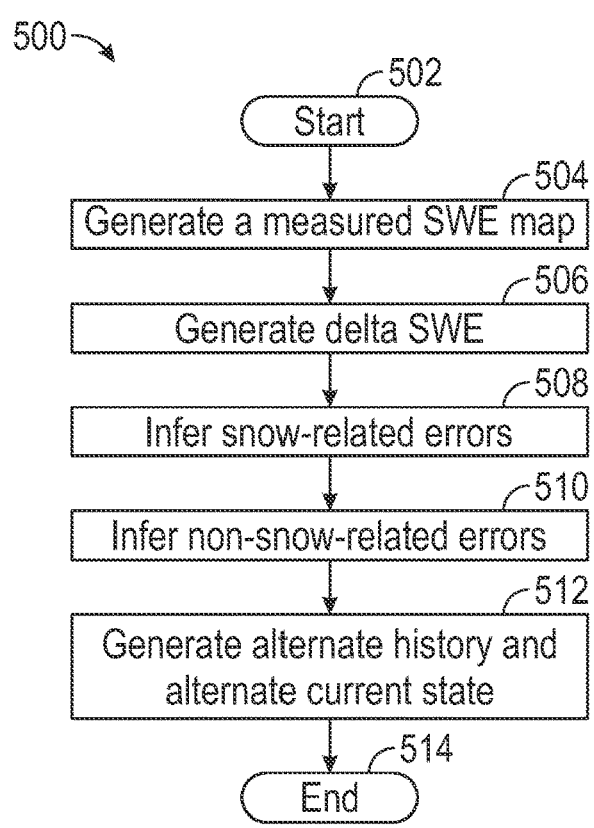
FIG. 5 illustrates a flowchart of an example method of partitioning an error source in a PBHM.

FIG. 5 illustrates a flowchart of an example method 500 of generating an alternate history and/or alternate current state in a PBHM to account for snow and non-snow water mass balance errors. The method 500 can be used to update a PBHM to account for such errors. The method starts at step 502. At step 504, a measured SWE map is generated. At step 506, a delta SWE map can be generated. At step 508, one or more errors in the PBHM, related to snow can be determined. For example, step 508 can include comparing the modeled snow data and the measurement-informed snow data to infer one or more PBHM errors in the PBHM's representation of the total water mass and/or spatial distribution of the snowpack.

At step 510, one or more additional errors in the history and/or state of the PBHM, are inferred based at least in part on the inferred snowpack errors and a water mass balance generated by the PBHM. At step 512, an alternate history and/or alternate current state are generated. The alternate history and/or alternate current state can be derived from linearization of a water mass balance up to a particular date of the measured snow data and composition of water mass balance errors with spatial flow routing information contained in the PBHM. In this context, composition may be understood as the application of two functions, wherein one function (e.g., a flow routing algorithm) is applied to the output of another function (e.g., subtraction of modeled and measurement-informed snow states). For example, by composing a delta SWE map with a terrain flow routing algorithm, SAWAM may infer errors in the subsurface (e.g., ground water or soil moisture) storage of grid cells that are downhill from an estimated location or locations of a snow error. In this way SAWAM may produce an alternate history and/or alternate current state that could plausibly have resulted from application of a PBHM to a pre-assimilation time period if the PBHM had more accurately simulated the snowpack dynamics leading up to the date of the measurement-informed snow data. The method ends at step 514. In some embodiments, the PBHM can be run iteratively, comparing the modeled and measurement-informed snow data, inferring errors in a modeled water mass balance of the PBHM, and updating the history and/or state of the PBHM using snow data representing sequential dates before generating a water supply forecast.

A PHBM may simulate hydrological dynamics by partitioning a mass of water, sometimes represented as depth or volume, between inputs, outputs, and several types of transient storage. Inputs typically include precipitation (P), which may include both snow and rain. Outputs typically include streamflow (Q), which may be understood as the mass of water leaving a watershed or flowing past a particular point; and evapotranspiration (ET), which may be understood as the water used by plants, evaporated from a surface, or sublimed from a snowpack. Transient storage may include water stored in the soil, rock, or other subsurface ground water representation (SG). Transient storage may also include water stored in stream channel networks or on the land surface (SC). Water may also be stored in a snowpack, typically represented as snow water equivalent (SWE), which may be understood as the amount of liquid water that would result from melting the snowpack at a location.

A PBHM may use hydrological equations and meteorological forcing data to simulate water balance fluxes, which may be understood as the change in water storage states and the accumulation of water outputs and inputs over a time period. Such a simulation may define a water mass balance, such that the sum of all inputs, outputs, and storage changes is constant over time in accordance with the principle of mass conservation. Equation (1) specifies an example water mass balance equation that may be implemented in a PBHM, wherein the sum of water inputs (precipitation, P) equals the sum of water outputs (streamflow, Q, and evapotranspiration, ET) plus any changes in water storage ($\Delta S_G$ and $\Delta S_C$) and/or increases or decreases in snowpack storage (SWE). The SWE term in Equation (1) may be positive or negative, depending on whether the snowpack increases or decreases on a simulation period, and likewise the $\Delta S$ terms may be positive or negative, depending on whether storage increases or decreases, while P, Q, and ET are always nonnegative.

$$\Sigma P = \Sigma Q + \Sigma ET + \Delta S_C + \Delta S_G + SWE \qquad \text{Equation (1)}$$

In some embodiments, subtracting the delta SWE map and/or snow volume modeled by a PBHM from an inferred precipitation error yields a residual error in the model's water mass balance. The inferred precipitation error may be zero if the snowpack error can be explained by errors in the PBHM dynamics without increasing or decreasing P. The partitioning of water between Q, ET, and $\Delta S$ on a given time period depends on the complex spatiotemporal interaction of processes like solar radiation, temperature, wind, snowmelt, rainfall, soil moisture, and more. A PBHM may estimate the partitioning of a water balance for the unique conditions on a pre-assimilation time period in a particular watershed. If the PBHM is reasonably accurate in its simulation of physical processes, the proportional routing of water mass balance fluxes may be approximately constant for small relative changes in P or SWE over a given time period. Thus, for the practically useful case that accumulated errors are not a large fraction of the total water mass balance, an error in runoff (streamflow plus channel storage change) may be estimated by constructing a runoff ratio, $(Q+\Delta S_C)/(P-SWE)$, and multiplying this ratio by the inferred (P–SWE) error, as shown in Eq. 2. The epsilon symbol, ε, denotes the error in a particular term, i.e., ε(P) indicates an inferred error in precipitation. In Equation (2), it may be seen that the relative partitioning of water mass balance fluxes determines the partitioning of inferred errors in those same fluxes. In other words, if the majority of water inputs was associated with runoff (as opposed to ground water storage) on a pre-assimilation period, the majority of inferred water input errors will be partitioned to runoff errors.

$$\sum \varepsilon(Q) + \varepsilon(\Delta S_C) = \left[ \frac{\sum Q + \Delta S_C}{\sum P - SWE} \right] * \left[ \sum \varepsilon(P) - \varepsilon(SWE) \right] \quad \text{Equation (2)}$$

Due to the availability of water at the land surface in the vicinity of a snowpack, it may be assumed that evapotranspiration from snowy areas is energy-limited and thus that landscape-average ET is unchanged for relatively small errors in SWE (e.g., ε(ET)=0). Thus, to enforce water mass conservation in Eq. 1, the error in subsurface storage changes (ground or soil water), ε($\Delta S_G$), can be estimated by subtracting the inferred streamflow error and inferred subsurface storage error from the sum of inferred precipitation and snowpack errors according to Equation (3).

$$\varepsilon(\Delta S_G) = \Sigma \varepsilon(P) - \varepsilon(SWE) - \Sigma \varepsilon(Q) - \varepsilon(\Delta S_C) \quad \text{Equation (3)}$$

It may be seen that by re-arranging Eq. 3 and assuming ε(ET)=0, an analogous form to Eq. 1 is obtained, which achieves the conservation of water mass during the water mass balance adjustment procedures. Thus, Eqs. 1-3 may constitute a method for adjusting the water mass balance of a PBHM based on an inferred snowpack error and the partitioning of water mass balance fluxes on a pre-assimilation time period.

When the above steps are performed, the volumetric errors in precipitation, streamflow, and subsurface storage flux will have been inferred from a single snow update. Consequently, the SAWAM can circumvent the problem of time irreversibility by using the forward model outputs to construct an approximate reverse model.

Figure 6:
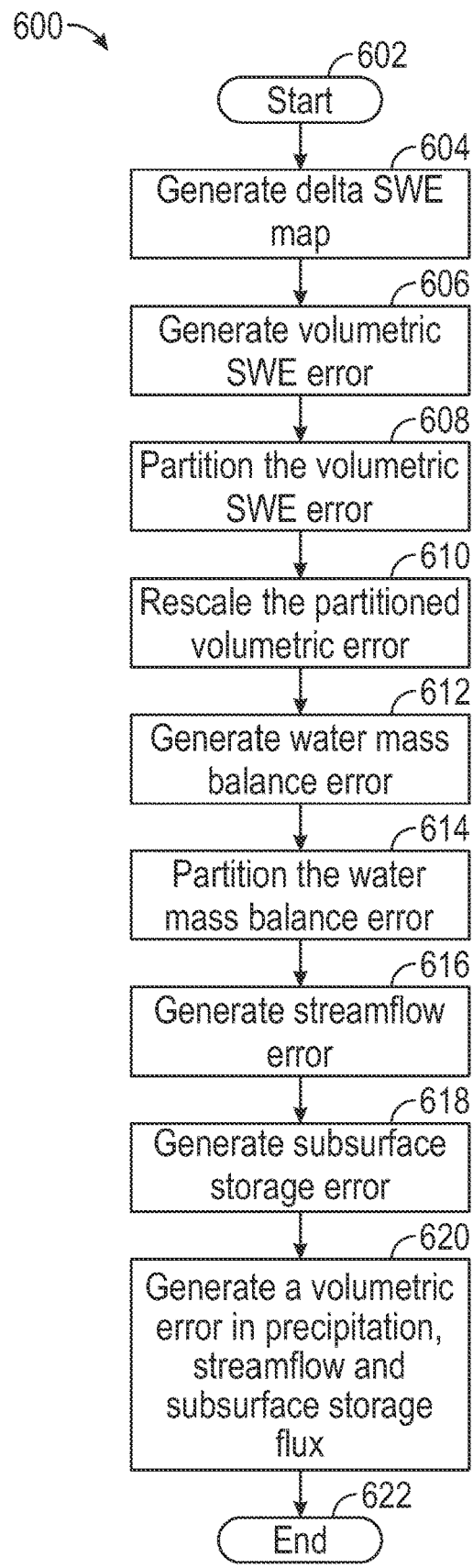
FIG. 6 illustrates a flowchart of an example method of determining errors in precipitation, streamflow, and subsurface storage.

FIG. 6 illustrates a flowchart of an example method 600 of determining errors in precipitation, streamflow and subsurface storage. The method starts at step 602. At step 604, a delta SWE map is generated. At step 606, a measure of volumetric SWE error is generated. At step 608, the volumetric SWE error is partitioned between two or more error sources. At step 610, the partitioned volumetric errors are rescaled. At step 612, a water mass balance error is generated by subtracting delta SWE from a precipitation error. At step 614, the water mass balance error is partitioned between two or more water mass balance components, such as water leaving a watershed through evapotranspiration (ET), water storage in the subsurface as soil moisture (S), or water flowing out of the watershed as streamflow (Q). At step 616, a measure of streamflow error is generated by scaling a runoff ratio by the water mass balance error. At step 618, a measure of subsurface storage is generated by subtracting the streamflow error from the water mass balance error. At step 620, a measure of volumetric error in precipitation, streamflow and subsurface storage is generated, in part based on the measures of errors determined at steps 616 and 618. The method ends at step 622.

Before starting the next model run, the SAWAM method can update the PBHM history and current state to correct the inferred errors. For example, the antecedent streamflow timeseries, current stream channel water storage, and current subsurface water storage maps can be updated to account for and offset the accumulated errors. The streamflow timeseries can be rescaled, so that the sum of the antecedent streamflow is increased or decreased by the Q error amount calculated previously. This rescaling makes use of a weighted scaling function such that inferred streamflow errors start at zero immediately after the previous assimilation period and increase in relation to the rapidity of SWE change onset. Further, it can be assumed that errors in streamflow may also be related to the magnitude of modeled streamflow, so that larger values of Q are associated with larger Q errors. Thus, the magnitude of inferred error at any particular timestep may be proportional to the degree of accumulated SWE change and the magnitude of pre-assimilation streamflow.

The next step in an example SAWAM method can involve updating the subsurface water storage volume and pattern. In some embodiments, this can be accomplished by calculating the residual error that is heretofore uncompensated (for example, S error=P error–SWE error–Q error, with Q error including the current channel storage update) and redistributing this error using a spatial composition with the model's flow routing scheme. Subsurface water storage in distributed physical hydrology models may be influenced by the percolation of water from the surface in addition to surface or subsurface lateral flow to and from neighboring grid cells. The error in subsurface storage caused by the water mass balance error is calculated as the difference of measured and modeled SWE depths in each grid cell multiplied by the ratio of the inferred area-averaged storage error to the negative area-averaged delta SWE value. This method of calculating the error in the subsurface storage attributable to snowpack or precipitation errors can increase the likelihood that the sum of all subsurface storage errors accumulated across grid cells can be equal to the pre-calculated S error. The method can also allow the spatial attribution of the error to different grid cells according to where the measured versus the modeled SWE error was the greatest.

Figure 7:
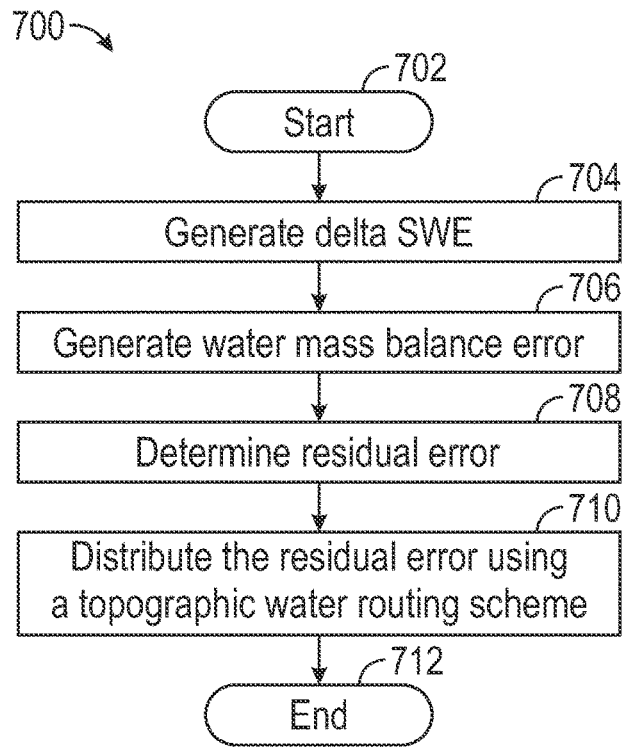
FIG. 7 illustrates a flowchart of an example method of distributing a correction, for a residual error, throughout a PBHM to improve the accuracy of the PBHM.

FIG. 7 illustrates a flowchart of an example method 700 of distributing a correction, for a residual error, throughout a PBHM to improve the accuracy of the PBHM. For example, the method 700 can be deployed to update one or more subsurface water storage states in a PBHM, in order to offset one or more errors. The method starts at step 702. At step 704, a delta SWE value can be generated. At step 706, a water mass balance error is generated, for example, by subtracting the delta SWE value from an inferred precipitation error. At step 708, a measure of a residual error is determined or generated by subtracting the streamflow error (Q) from the water mass balance error. At step 710, the residual error is distributed throughout the region, sources and model elements, using a topographic water routing scheme. The method ends at step 712.

The inferred subsurface storage error in each grid cell affects all downstream grid cells as well, since the missing/extra water should have/did flow downhill during the pre-assimilation period. To efficiently handle the routing of errors to downstream grid cells, the SAWAM method can include pre-calculating a map of the downstream flow directions for each grid cell and identifying the downstream flow path for every grid cell in the model domain. In some embodiments, the downstream paths for the grid cells can be generated using a deterministic-8 topographic flow routing scheme, wherein flow is routed to the steepest downhill neighboring cell adjoining any particular cell. For every grid cell with a positive or negative local SWE error, the proportional subsurface error is calculated and subtracted or added to the subsurface water storage of the downstream cells in proportion to both the pre-assimilation water storage depth and each cell's upstream flow accumulation area. This method can also infer changes in the spatial distribution of subsurface water storage when the distribution of the snowpack is updated based on new data, even if the total volume change is small. A realistic subsurface storage state, including both volume and spatial distribution, can be helpful for water supply forecasting, since streamflow is generated from the saturated portion of the soil.

After the flow path redistribution of storage errors is accomplished for each grid cell, local hydraulic gradients may become unrealistic in certain areas, e.g., where the water table depth increased or decreased more than is supported by the stable hydraulic gradient between neighboring cells. In some embodiments, the SAWAM subsurface redistribution method can address this issue by allowing water to flow laterally to neighboring cells based on the local hydraulic gradient. However, evolving the subsurface storage with a hydraulic flow model is an iterative process that in some cases, may not have a defined stopping point and can continue until all the saturated soil has drained, producing a storage state that is not necessarily representative of the hydrological conditions on the assimilation date. In some embodiments, and for models that are calibrated, it is desirable to approximately preserve the non-equilibrium hydraulic gradients that existed in the model prior to assimilation. The SAWAM method can convolve the updated subsurface storage map with a local grid cell sliding kernel (e.g., a 3×3 matrix of weights applied as a sliding kernel), wherein the sum of (post-assimilation) storage in the 9-cell kernel window remains unchanged, but the ratios of each cell to the mean of all 9 cells is updated to reflect the local pre-assimilation storage pattern in the same spatial location.

Next, the subsurface water storage map may be constrained so that the volumetric water capacity (VWC=liquid water depth/soil depth) is between the logical constraints defined by the soil characteristics of each grid cell (e.g., in DHSVM, field capacity<VWC<porosity). If these constraints require changes to the post-assimilation water storage of a particular grid cell, the extra/excess water may be redistributed according to the weighted sum of the "ideal" pattern defined by the flow paths and the kernel, and the "availability" pattern defined by the VWC space available to gain/lose water. The process of constraining VWC and redistributing storage may continue iteratively until the total inferred subsurface storage update is satisfied.

When the assimilation is complete, the updated maps of snow states, subsurface water storage, and channel storage are used to re-start the hydrological model (i.e., the PBHM). The model can be run until the next assimilation date or the end of a period of interest, such as a water supply forecast period.

Figure 8:
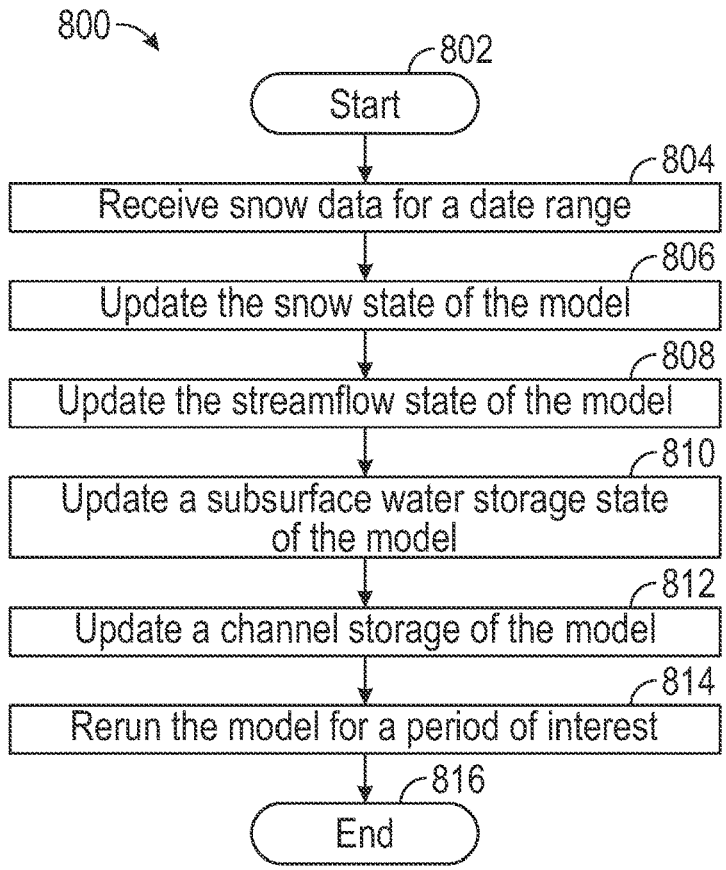
FIG. 8 illustrates a flowchart of an example method for more accurately forecasting water supplies, by assimilating the snow data corresponding to a date range.

FIG. 8 illustrates a flowchart of an example method 800 for more accurately forecasting water supplies, by assimilating the snow data corresponding to a date range. The method starts at step 802. At step 804, the snow data for a date range is received. At step 806, the snow state of the model can be updated, based in part on the snow data. At step 808, the streamflow state of the model can be updated based in part on the snow data. At step 810, a subsurface water storage state of the model can be updated based in part on the snow data. At step 812, a channel storage state of the model can be updated, based in part on the snow data. At step 814, the model can be rerun for a period of interest. The method ends at step 816. In other words, the model can operate in two phases. In the first phase, steps 804 through 812 are performed, where a snow data for a particular date range is assimilated in the model and various states of the model are correspondingly updated to assimilate the snow data. In the second phase, the model can be run for any date of interest, including a future date of interest to render a forecast for the water supply.

A full assimilation procedure, according to the described embodiments, can be implemented during model calibration using historical snow data. In some implementations of the SAWAM method, the assimilation includes retroactively changing the model's previous output, and updating the model streamflow timeseries and current snow states. Since both the previous model outputs and updated streamflow timeseries and future snow states are used as calibration targets, the calibration is influenced by a feedback loop between the base hydrology model (the PBHM) and the assimilation method. By including the assimilation method in the historical calibration using measurement-informed snow data from corresponding years, the assumptions underlying the SAWAM method are implicitly tested, and models more closely satisfying the assumptions are likely to be selected for ensemble forecasting on the basis of their better historical results.

The SAWAM framework includes a hydrological modeling architecture that can change the way a physically based distributed hydrology model operates by bias correcting the model's history and current state according to observed snow maps and a local linearization of the hydrological processes represented by the history and current state of the PBHM. The described embodiments include the ability to more precisely match the volume and spatial distribution of measured SWE maps, retaining the advantages of "direct insertion", but without violating the water mass balance, and while avoiding unrealistic disruption of the model dynamics. A PBHM is typically very sensitive to small disruptions in the model dynamics, so direct insertion can upset the modeled processes, producing unrealistic and physically unfeasible results. By producing an alternative history and current state for the PBHM, the described embodiments can avoid upsetting the model and thus generate more physically plausible results from the PBHM. The described embodiments can also be implemented using snow maps produced by various models instead of or in addition to actual snow observations. For example, several dedicated snowpack models such as SnowPALM, iSnobal, etc. offer a more sophisticated representation of the snowpack compared to PBHMs such as DHSVM or WRF-Hydro. While lacking the flow routing and other hydrological capabilities of a physically based hydrological model suitable for water supply forecasting (such as DHSVM, WRF-Hydro, etc.), dedicated snowpack models can still provide a useful representation of the snowpack, which can be used in the described embodiments, in addition to, or in lieu of, actual snow observations. In this scenario, the outputs from one or more specialized snow models can be used to replace the remotely sensed maps of snow water equivalent. In some embodiments, the PBHM can be a DHSVM. It is also possible to substitute a different physical hydrology model (such as WRF-Hydro) instead of DHSVM, so long as the model of choice produces similar time series and map outputs and is capable of ingesting updated states.

In historical test comparisons, the described assimilation method (SAWAM) produced substantially more accurate simulated water supply forecasts with lower uncertainty compared to existing methods, including the direct-insertion-only methods used with the same snow data or the hydrological model used alone without any assimilation. SAWAM can be used to infer errors in multiple hydrological processes, based on measurements of only a single state (the snowpack), helping to realize the full value of remotely sensed snow data. Additionally, embodiments, including the SAWAM assimilation method, better preserve the logical foundation of physically based hydrological models by preserving the mass balance and maintaining process continuity.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 9:
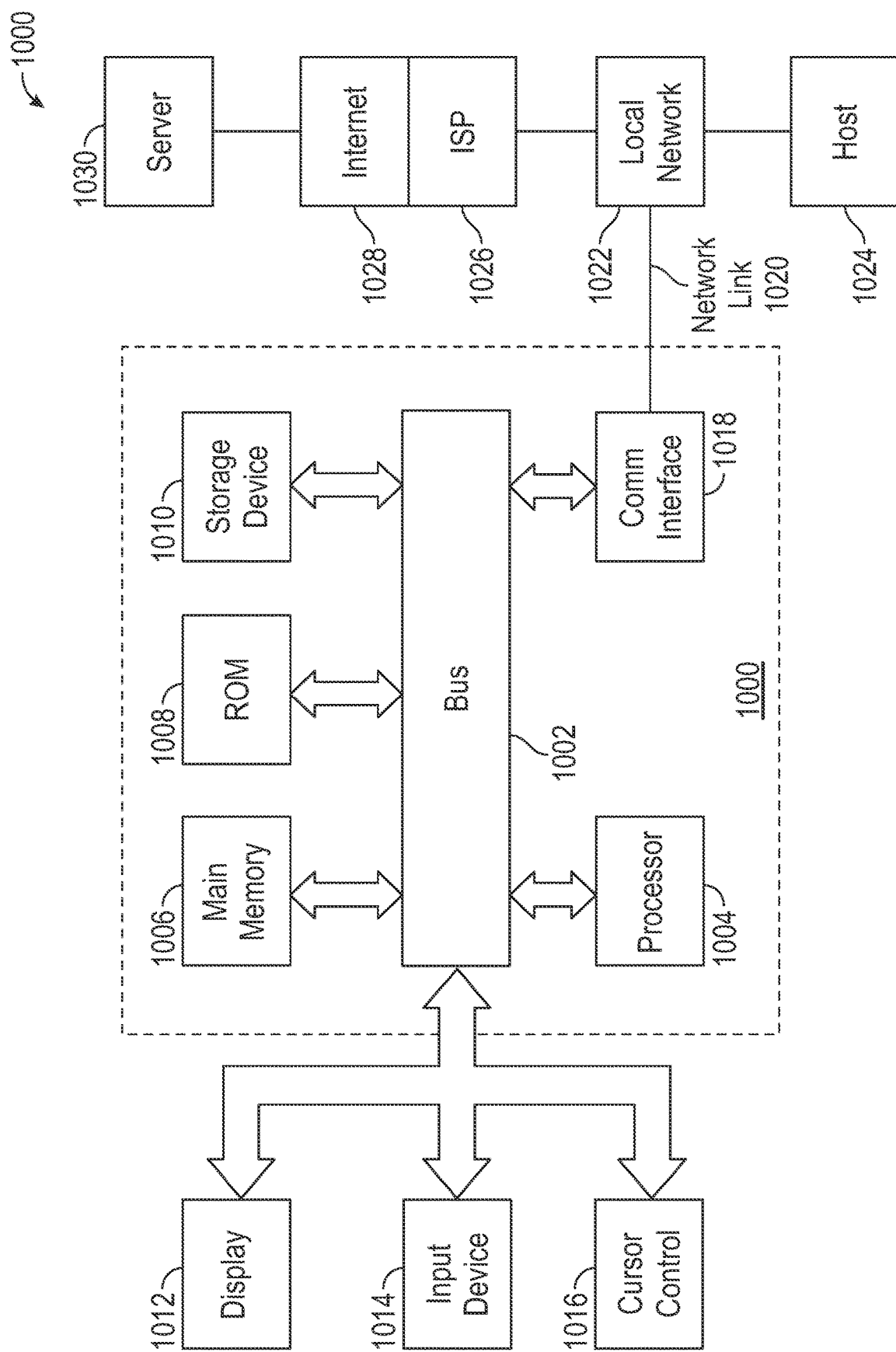
FIG. 9 illustrates an environment upon which some embodiments can be implemented.

For example, FIG. 9 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: obtaining measurement-informed snow data representing an estimate of a snowpack state on a particular date; running a physically based hydrological model (PBHM) up to the date of the measurement-informed snow data, thereby generating analogous modeled snow data, wherein the PBHM comprises at least in part a representation of water mass and a set of connected model elements representing topographic features; comparing the modeled snow data and the measurement-informed snow data to infer one or more PBHM errors in the total water mass and/or spatial distribution of a snowpack representation in the PBHM, the one or more PBHM errors comprising one or more inferred snowpack errors; inferring one or more additional errors in a history and/or current state of the PBHM, based at least in part on the inferred snowpack errors and water mass balance data generated by the PBHM, wherein water mass balance data comprises information on the movement and/or storage of water represented by the PBHM; generating an alternate history and/or alternate current state for the PBHM, wherein the alternate history and/or alternate current state are derived at least in part by offsetting the inferred errors with adjustments to one or more PBHM water mass representations and/or with adjustments to the spatial distribution of water storage represented by the PBHM, wherein PBHM water mass representations are adjusted based at least in part on water mass balance data modeled by the PBHM on a pre-assimilation time period, wherein the spatial distribution of water storage represented by the PBHM is adjusted at least in part by propagating corrections to the inferred snowpack errors among connected model elements, using topographic flow routing data and/or a channel network representation; and generating a water supply forecast, based at least in part on the alternate history and/or the alternate current state of the PBHM.

Example 2: The method of Example 1, further comprising: iteratively running the PBHM, comparing the modeled and measurement-informed snow data, inferring errors in a modeled water mass balance of the PBHM, and updating the history and/or current state of the PBHM using snow data representing sequential dates before generating a water supply forecast.

Example 3: The method of some or all of Examples 1 and 2, further comprising: comparing the measurement-informed snow data with spatial precipitation data from one or more meteorological sources of data; generating a multiplier map, wherein the multiplier map locally redistributes cold-season precipitation from areas with little snow to areas with deep snow accumulation; and running the PBHM with the multiplier map.

Example 4: The method of some or all of Examples 1-3, further comprising: receiving and/or generating the measurement-informed snow data in a form of a snow water equivalent map, wherein snow water equivalent map comprises a depth of liquid water resulting from melting the snow at a location; generating a delta snow water equivalent map by subtracting from the measured snow water equivalent map, a modeled snow water equivalent map; calculating a volumetric water mass balance error and/or spatial water distribution errors of the PBHM, based at least in part on the delta snow water equivalent map; and updating a representation of water mass and/or a water mass balance history of the PBHM, based at least in part on the volumetric error and/or spatial water distribution errors.

Example 5: The method of some or all of Examples 1-4, further comprising: receiving and/or generating the measurement-informed snow data in a form of a snow water equivalent map, wherein the snow water equivalent map comprises a depth of liquid water resulting from melting the snow at a location; generating a delta snow water equivalent map by subtracting from the measured snow water equivalent map, a modeled snow water equivalent map; calculating a delta snow water equivalent volume error; partitioning a snow water equivalent volume error between precipitation error and liquid water error, inferring a precipitation error; calculating a net error in a liquid water mass balance of the PBHM by subtracting the delta snow water equivalent volume error from the inferred precipitation error; estimating a streamflow error by scaling the liquid water mass balance error by a runoff ratio, wherein the runoff ratio is the proportion of liquid water inputs leaving a watershed as streamflow and/or accumulation in a stream channel network on a pre-assimilation period; estimating a channel storage error by using one or more flow routing equations of the PBHM and/or the channel state corresponding to a most recent post-assimilation streamflow value; estimating a subsurface storage error by subtracting the streamflow error and channel storage error from the liquid water mass balance error; and updating the streamflow history and the current state of the channel network and subsurface storage to correct the estimated errors.

Example 6: The method of some or all of Examples 1-5, wherein the one or more additional errors comprise one or more of: precipitation error, streamflow error, current stream channel water storage error, and current subsurface water storage error.

Example 7: The method of some or all of Examples 1-6, wherein a streamflow error is inferred from measurement-informed streamflow data and modeled streamflow data, and one or more additional errors in the water mass balance of the PBHM are inferred from a combination of inferred snow error and inferred streamflow error.

Example 8: The method of some or all of Examples 1-7, wherein the inference of one or more additional errors is accomplished at least in part by linearization of a water mass balance timeseries generated by the PBHM on a pre-assimilation time period, comprising: extracting one or more water mass balance terms from the PBHM on a pre-assimilation time period; calculating a numerical relationship between the one or more modeled water mass balance terms and the modeled snow state such that increases or decreases in the modeled snow state can be associated with increases or decreases in one or more additional water mass balance terms; and applying the calculated numerical relationship to the inferred snow error term to infer one or more errors in the one or more additional water mass balance terms.

Example 9: The method of some or all of Examples 1-8, further comprising: inferring a streamflow error based at least in part on inferred snowpack errors; updating a streamflow timeseries history of the PBHM by adjusting the streamflow timeseries history to remove the inferred streamflow error, the adjustment further comprising applying a weighted scaling function that starts at zero at the beginning of an assimilation period and increases in relation to the rapidity of changes in snow water equivalent and/or the magnitude of streamflow.

Example 10: The method of some or all of Examples 1-9, further comprising: inferring a streamflow error based at least in part on inferred snowpack errors; inferring a stream channel storage error, based at least in part on the inferred streamflow error; distributing the stream channel storage error among one or more model channel elements or segments, based at least in part on the spatial distribution of inferred snowpack errors propagated to downstream channels with a channel routing scheme of the PBHM.

Example 11: The method of some or all of Examples 1-10, further comprising: inferring a subsurface water storage error, based at least in part on inferred snowpack errors; distributing the subsurface water storage error among one or more model elements and/or grid cells, based at least in part on a spatial distribution of inferred snowpack errors propagated to downhill locations with a topographic water routing scheme of the PBHM.

Example 12: A non-transitory computer storage medium that stores executable program instructions that, when executed by one or more computing devices, configure the one or more computing devices to perform operations comprising: obtaining measurement-informed snow data representing an estimate of a snowpack state on a particular date; running a physically based hydrological model (PBHM) up to the date of the measurement-informed snow data, thereby generating analogous modeled snow data, wherein the PBHM comprises at least in part a representation of water mass and a set of connected model elements representing topographic features; comparing the modeled snow data and the measurement-informed snow data to infer one or more PBHM errors in the total water mass and/or spatial distribution of a snowpack representation in the PBHM, the one or more PBHM errors comprising one or more inferred snowpack errors; inferring one or more additional errors in a history and/or current state of the PBHM, based at least in part on the inferred snowpack errors and water mass balance data generated by the PBHM, wherein water mass balance data comprises information on the movement and/or storage of water represented by the PBHM; generating an alternate history and/or alternate current state for the PBHM, wherein the alternate history and/or alternate current state are derived at least in part by offsetting the inferred errors with adjustments to one or more PBHM water mass representations and/or with adjustments to the spatial distribution of water storage represented by the PBHM, wherein PBHM water mass representations are adjusted based at least in part on water mass balance data modeled by the PBHM on a pre-assimilation time period, wherein the spatial distribution of water storage represented by the PBHM is adjusted at least in part by propagating corrections to the inferred snowpack errors among connected model elements, using topographic flow routing data and/or a channel network representation; and generating a water supply forecast, based at least in part on the alternate history and/or the alternate current state of the PBHM.

Example 13: The non-transitory computer storage of Example 12, wherein the operations further comprise: iteratively running the PBHM, comparing the modeled and measurement-informed snow data, inferring errors in a modeled water mass balance of the PBHM, and updating the history and/or current state of the PBHM using snow data representing sequential dates before generating a water supply forecast.

Example 14: The non-transitory computer storage of some or all of Examples 12 and 13, wherein the operations further comprise: comparing the measurement-informed snow data with spatial precipitation data from one or more meteorological sources of data; generating a multiplier map, wherein the multiplier map locally redistributes cold-season precipitation from areas with little snow to areas with deep snow accumulation; and running the PBHM with the multiplier map.

Example 15: The non-transitory computer storage of some or all of Examples 12-14, wherein the operations further comprise: receiving and/or generating the measurement-informed snow data in a form of a snow water equivalent map, wherein snow water equivalent map comprises a depth of liquid water resulting from melting the snow at a location; generating a delta snow water equivalent map by subtracting from the measured snow water equivalent map, a modeled snow water equivalent map; calculating a volumetric water mass balance error and/or spatial water distribution errors of the PBHM, based at least in part on the delta snow water equivalent map; and updating a representation of water mass and/or a water mass balance history of the PBHM, based at least in part on the volumetric error and/or spatial water distribution errors.

Example 16: The non-transitory computer storage of some or all of Examples 12-15, wherein the operations further comprise: receiving and/or generating the measurement-informed snow data in a form of a snow water equivalent map, wherein the snow water equivalent map comprises a depth of liquid water resulting from melting the snow at a location; generating a delta snow water equivalent map by subtracting from the measured snow water equivalent map, a modeled snow water equivalent map; calculating a delta snow water equivalent volume error; partitioning a snow water equivalent volume error between precipitation error and liquid water error, inferring a precipitation error; calculating a net error in a liquid water mass balance of the PBHM by subtracting the delta snow water equivalent volume error from the inferred precipitation error; estimating a streamflow error by scaling the liquid water mass balance error by a runoff ratio, wherein the runoff ratio is the proportion of liquid water inputs leaving a watershed as streamflow and/or accumulation in a stream channel network on a pre-assimilation period; estimating a channel storage error by using one or more flow routing equations of the PBHM and/or the channel state corresponding to a most recent post-assimilation streamflow value; estimating a subsurface storage error by subtracting the streamflow error and channel storage error from the liquid water mass balance error; and updating the streamflow history and the current state of the channel network and subsurface storage to correct the estimated errors.

Example 17: The non-transitory computer storage of some or all of Examples 12-16, wherein the one or more additional errors comprise one or more of: precipitation error, streamflow error, current stream channel water storage error, and current subsurface water storage error.

Example 18: The non-transitory computer storage of some or all of Examples 12-17, wherein a streamflow error is inferred from measurement-informed streamflow data and modeled streamflow data, and one or more additional errors in the water mass balance of the PBHM are inferred from a combination of inferred snow error and inferred streamflow error.

Example 19: A method of forecasting water supply comprising: receiving or generating snow data, representing a particular date or range of dates; assimilating the snow data into a physically based hydrological model (PBHM), the assimilation comprising: updating a snow state of the PBHM, based at least in part on the snow data, and at least one or more of: updating a streamflow history of the PBHM, based at least in part on the snow data and/or; updating a subsurface water storage state of the PBHM, based at least in part on the snow data and/or; updating a channel storage state of the PBHM, based at least in part on the snow data; and continuously running the PBHM for a subsequent period of interest.

Example 20: The method of Example 19, further comprising: calibrating the PBHM with sequential assimilation of historical measurement-informed snow datasets.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
   obtaining measurement-informed snow data representing an estimate of a snowpack state on a particular date;
   running a physically based hydrological model (PBHM) up to the date of the measurement-informed snow data, thereby generating analogous modeled snow data, wherein the PBHM comprises at least in part a representation of water mass and a set of connected model elements representing topographic features;
   generating a meta model structure, the meta model structure, comprising a changeable history and current state of the PBHM;
   coupling the PBHM to the meta model structure;
   comparing the modeled snow data and the measurement-informed snow data to infer one or more PBHM errors in the total water mass and/or spatial distribution of a snowpack representation in the PBHM, the one or more PBHM errors comprising one or more inferred snowpack errors;
   inferring one or more additional errors in a history and/or current state of the PBHM, based at least in part on the inferred snowpack errors and water mass balance data generated by the PBHM, wherein water mass balance data comprises information on the movement and/or storage of water represented by the PBHM;

updating the meta model structure by retroactively changing the PBHM history and state;

replacing outputs of the PBHM with outputs from the coupled meta model structure, wherein the combination of the meta model and the PBHM are configured to perform operations comprising:

generating an alternate history and/or alternate current state for the PBHM, wherein the alternate history and/or alternate current state are derived at least in part by offsetting the inferred errors with adjustments to one or more PBHM water mass representations and/or with adjustments to the spatial distribution of water storage represented by the PBHM, wherein PBHM water mass representations are adjusted based at least in part on water mass balance data modeled by the PBHM on a pre-assimilation time period, wherein the spatial distribution of water storage represented by the PBHM is adjusted at least in part by propagating corrections to the inferred snowpack errors among connected model elements, using topographic flow routing data and/or a channel network representation;

modifying the PBHM by updating the history of the PBHM and the current state of the PBHM with the alternate history and the alternate current state; and generating a water supply forecast, based at least in part on the alternate history and/or the alternate current state of the coupled meta model structure and PBHM.

2. The method of claim 1, further comprising: iteratively running the PBHM, comparing the modeled and measurement-informed snow data, inferring errors in a modeled water mass balance of the PBHM, and updating the history and/or current state of the PBHM using snow data representing sequential dates before generating a water supply forecast.

3. The method of claim 1, further comprising:
comparing the measurement-informed snow data with spatial precipitation data from one or more meteorological sources of data;
generating a multiplier map, wherein the multiplier map locally redistributes cold-season precipitation from areas with little snow to areas with deep snow accumulation; and
running the PBHM with the multiplier map.

4. The method of claim 1, further comprising:
receiving and/or generating the measurement-informed snow data in a form of a snow water equivalent map, wherein snow water equivalent map comprises a depth of liquid water resulting from melting the snow at a location;
generating a delta snow water equivalent map by subtracting from the measured snow water equivalent map, a modeled snow water equivalent map;
calculating a volumetric water mass balance error and/or spatial water distribution errors of the PBHM, based at least in part on the delta snow water equivalent map; and
updating a representation of water mass and/or a water mass balance history of the PBHM, based at least in part on the volumetric error and/or spatial water distribution errors.

5. The method of claim 1, further comprising:
receiving and/or generating the measurement-informed snow data in a form of a snow water equivalent map, wherein the snow water equivalent map comprises a depth of liquid water resulting from melting the snow at a location;
generating a delta snow water equivalent map by subtracting from the measured snow water equivalent map, a modeled snow water equivalent map;
calculating a delta snow water equivalent volume error;
partitioning a snow water equivalent volume error between precipitation error and liquid water error, inferring a precipitation error; calculating a net error in a liquid water mass balance of the PBHM by subtracting the delta snow water equivalent volume error from the inferred precipitation error;
estimating a streamflow error by scaling the liquid water mass balance error by a runoff ratio, wherein the runoff ratio is the proportion of liquid water inputs leaving a watershed as streamflow and/or accumulation in a stream channel network on a pre-assimilation period;
estimating a channel storage error by using one or more flow routing equations of the PBHM and/or the channel state corresponding to a most recent post-assimilation streamflow value;
estimating a subsurface storage error by subtracting the streamflow error and channel storage error from the liquid water mass balance error; and
updating the streamflow history and the current state of the channel network and subsurface storage to correct the estimated errors.

6. The method of claim 1, wherein the one or more additional errors comprise one or more of: precipitation error, streamflow error, current stream channel water storage error, and current subsurface water storage error.

7. The method of claim 1, wherein a streamflow error is inferred from measurement-informed streamflow data and modeled streamflow data, and one or more additional errors in the water mass balance of the PBHM are inferred from a combination of inferred snow error and inferred streamflow error.

8. The method of claim 1, wherein the inference of one or more additional errors is accomplished at least in part by linearization of a water mass balance timeseries generated by the PBHM on a pre-assimilation time period, comprising:
extracting one or more water mass balance terms from the PBHM on a pre-assimilation time period;
calculating a numerical relationship between the one or more modeled water mass balance terms and the modeled snow state such that increases or decreases in the modeled snow state can be associated with increases or decreases in one or more additional water mass balance terms; and
applying the calculated numerical relationship to the inferred snow error term to infer one or more errors in the one or more additional water mass balance terms.

9. The method of claim 1, further comprising:
inferring a streamflow error based at least in part on inferred snowpack errors;
updating a streamflow timeseries history of the PBHM by adjusting the streamflow timeseries history to remove the inferred streamflow error, the adjustment further comprising applying a weighted scaling function that starts at zero at the beginning of an assimilation period and increases in relation to the rapidity of changes in snow water equivalent and/or the magnitude of streamflow.

10. The method of claim 1, further comprising:
inferring a streamflow error based at least in part on inferred snowpack errors;
inferring a stream channel storage error, based at least in part on the inferred streamflow error;
distributing the stream channel storage error among one or more model channel elements or segments, based at least in part on the spatial distribution of inferred snowpack errors propagated to downstream channels with a channel routing scheme of the PBHM.

11. The method of claim 1, further comprising:
inferring a subsurface water storage error, based at least in part on inferred snowpack errors;
distributing the subsurface water storage error among one or more model elements and/or grid cells, based at least in part on a spatial distribution of inferred snowpack errors propagated to downhill locations with a topographic water routing scheme of the PBHM.

12. The method of claim 1, further comprising: calibrating the combination of the meta model and the PBHM, by performing operations comprising:
performing assimilation comprising retroactively changing the PBHM previous outputs and updating a streamflow timeseries and current state of the PBHM, based at least partly on the measurement-informed snow data;
setting calibration targets, based at least partly on previous outputs of the PBHM and updated streamflow; and
selecting a PBHM, as base hydrology model, based at least in part on a feedback loop between the selected PBHM and assimilation outputs.

13. The method of claim 1, wherein modifying the PBHM further comprises: bias correcting the history and current state of the PBHM according to observed snow maps, generated based on previous outputs of the PBHM, the measurement-informed snow data, and local linearization of hydrological processes represented by the history and current state of the PBHM.

14. A non-transitory computer storage medium that stores executable program instructions that, when executed by one or more computing devices, configure the one or more computing devices to perform operations comprising:
obtaining measurement-informed snow data representing an estimate of a snowpack state on a particular date;
running a physically based hydrological model (PBHM) up to the date of the measurement-informed snow data, thereby generating analogous modeled snow data, wherein the PBHM comprises at least in part a representation of water mass and a set of connected model elements representing topographic features;
generating a meta model structure, the meta model structure, comprising a changeable history and current state of the PBHM;
replacing outputs of the PBHM with outputs from the coupled meta model structure, wherein the combination of the meta model and the PBHM are configured to perform operations comprising:
comparing the modeled snow data and the measurement-informed snow data to infer one or more PBHM errors in the total water mass and/or spatial distribution of a snowpack representation in the PBHM, the one or more PBHM errors comprising one or more inferred snowpack errors;
inferring one or more additional errors in a history and/or current state of the PBHM, based at least in part on the inferred snowpack errors and water mass balance data generated by the PBHM, wherein water mass balance data comprises information on the movement and/or storage of water represented by the PBHM;
updating the meta model structure, by retroactively changing the PBHM history and state;
coupling the meta model to the PBHM, wherein the combination of the meta model and the PBHM are configured to perform operations comprising:
generating an alternate history and/or alternate current state for the PBHM, wherein the alternate history and/or alternate current state are derived at least in part by offsetting the inferred errors with adjustments to one or more PBHM water mass representations and/or with adjustments to the spatial distribution of water storage represented by the PBHM, wherein PBHM water mass representations are adjusted based at least in part on water mass balance data modeled by the PBHM on a pre-assimilation time period, wherein the spatial distribution of water storage represented by the PBHM is adjusted at least in part by propagating corrections to the inferred snowpack errors among connected model elements, using topographic flow routing data and/or a channel network representation;
modifying the PBHM by updating the history of the PBHM and the current state of the PBHM with the alternate history and the alternate current state; and
generating a water supply forecast, based at least in part on the alternate history and/or the alternate current state of the coupled meta model structure and PBHM.

15. The non-transitory computer storage of claim 14, wherein the operations further comprise: iteratively running the PBHM, comparing the modeled and measurement-informed snow data, inferring errors in a modeled water mass balance of the PBHM, and updating the history and/or current state of the PBHM using snow data representing sequential dates before generating a water supply forecast.

16. The non-transitory computer storage of claim 14, wherein the operations further comprise:
comparing the measurement-informed snow data with spatial precipitation data from one or more meteorological sources of data;
generating a multiplier map, wherein the multiplier map locally redistributes cold-season precipitation from areas with little snow to areas with deep snow accumulation; and
running the PBHM with the multiplier map.

17. The non-transitory computer storage of claim 14, wherein the operations further comprise:
receiving and/or generating the measurement-informed snow data in a form of a snow water equivalent map, wherein snow water equivalent map comprises a depth of liquid water resulting from melting the snow at a location;
generating a delta snow water equivalent map by subtracting from the measured snow water equivalent map, a modeled snow water equivalent map;
calculating a volumetric water mass balance error and/or spatial water distribution errors of the PBHM, based at least in part on the delta snow water equivalent map; and
updating a representation of water mass and/or a water mass balance history of the PBHM, based at least in part on the volumetric error and/or spatial water distribution errors.

18. The non-transitory computer storage of claim 14, wherein the operations further comprise:

receiving and/or generating the measurement-informed snow data in a form of a snow water equivalent map, wherein the snow water equivalent map comprises a depth of liquid water resulting from melting the snow at a location;

generating a delta snow water equivalent map by subtracting from the measured snow water equivalent map, a modeled snow water equivalent map;

calculating a delta snow water equivalent volume error;

partitioning a snow water equivalent volume error between precipitation error and liquid water error, inferring a precipitation error; calculating a net error in a liquid water mass balance of the PBHM by subtracting the delta snow water equivalent volume error from the inferred precipitation error;

estimating a streamflow error by scaling the liquid water mass balance error by a runoff ratio, wherein the runoff ratio is the proportion of liquid water inputs leaving a watershed as streamflow and/or accumulation in a stream channel network on a pre-assimilation period;

estimating a channel storage error by using one or more flow routing equations of the PBHM and/or the channel state corresponding to a most recent post-assimilation streamflow value;

estimating a subsurface storage error by subtracting the streamflow error and channel storage error from the liquid water mass balance error; and updating the streamflow history and the current state of the channel network and subsurface storage to correct the estimated errors.

19. The non-transitory computer storage of claim 14, wherein the one or more additional errors comprise one or more of: precipitation error, streamflow error, current stream channel water storage error, and current subsurface water storage error.

20. The non-transitory computer storage of claim 14, wherein a streamflow error is inferred from measurement-informed streamflow data and modeled streamflow data, and one or more additional errors in the water mass balance of the PBHM are inferred from a combination of inferred snow error and inferred streamflow error.

* * * * *